_United States Patent Office_

3,503,785
Patented Mar. 31, 1970

3,503,785
PROCESS OF FORMING A POLYETHYLENE COATING USING A VANADIUM COMPOUND AS THE CATALYST
Uno Kruse, Neptune, N.J., assignor to National Lead Company, New York, N.Y., a corporation of New Jersey
No Drawing. Filed Nov. 15, 1967, Ser. No. 683,124
Int. Cl. B44d 1/14; C03c 25/04
U.S. Cl. 117—62.2                   8 Claims

ABSTRACT OF THE DISCLOSURE

This invention concerns a method for polymerizing ethylene monomer to completely and individually encase particles, fibers or filaments of substrate material. Vanadium tetrachloride ($VCl_4$) is added to a substrate slurry, is then reduced by ethylene to vanadium trichloride ($VCl_3$) which is homogeneously precipitated onto the substrate surfaces. An organometallic reagent is then reacted with the $VCl_3$ treated substrate to complete the formation of the active catalyst sites on the substrate surfaces for subsequent polymerization of ethylene monomer thereon.

BACKGROUND OF THE INVENTION

In the art of individually encapsulating discrete substrate particles, fibers or filaments with polyethylene, various organometallic-transition metal halide catalyst systems have been employed. In the employment of known processes and catalyst systems, the choice of a particular catalyst system is based on an evaluation of performance in terms of efficiency, rate of polymerization, temperature restrictions, degree of sensitivity to impurities, effect on the molecular weight of the polymer formed, quality of the polymer coating and processing cost. I have now found a method of forming an organometallic-transition metal halide catalyst system which makes its performance superior in terms of the above mentioned criteria, to any heretofore disclosed.

SUMMARY OF THE INVENTION

The objects of this invention include:

(1) a method of forming and using a more efficient catalyst system than heretofore known for the encapsulation of substrates with polyethylene,
(2) a method of forming a homogeneous precipitate of initial catalyst component over the entire surface area of substrate particles, fibers or filaments,
(3) a method of encapsulating substrates with polyethylene employing a catalyst system which:
  (a) will increase the rate of polymerization,
  (b) is less sensitive to formation and polymerization temperatures,
  (c) can be formed at elevated temperatures without affecting the molecular weight of the polymer formed,
  (d) is less sensitive to moisture and other impurities and
  (e) gives high quality polymer coatings, in relation to systems heretofore known.

Other objects and advantages will become apparent from the following more complete description and claims.

Briefly, the encapsulation process, i.e. the complete coating of discrete substrate particles, fibers or filaments with separate shells or tubes of polyethylene, contemplates the steps of forming a substrate slurry in an organic liquid medium, adding vanadium tetrachloride ($VCl_4$) to the substrate slurry, introducing ethylene and thereby reducing the vanadium tetrachloride ($VCl_4$) to vanadium trichloride ($VCl_3$), depositing a substantially uniform and homogeneous layer of $VCl_3$ on the substrate surfaces, reacting on organometallic reagent with the $VCl_3$ on the treated substrate to form a polymerization initiator homogeneously dispersed over the entire substrate surface area and polymerizing ethylene on and about the substrate.

DESCRIPTION OF THE PREFERRED EMBODIMENTS

It has been found that the benefits of this invention can be achieved only when the process is conducted in a specified manner and within the framework of specific precautions. It is essential to form the $VCl_3$ in the presence of the substrate. Where a substrate is added to $VCl_3$ already substantially formed by an ethylene induced reduction of $VCl_4$, a satisfactory encapsuled product is not obtained. Initial formation of the catalyst complex, i.e. the reaction product of $VCl_3$ and an organometallic reagent, apart from the substrate ultimately produces a mixture of uncoated substrate and free polymer.

It is also essential that the reduction of the $VCl_4$ to $VCl_3$ be substantially completely caused by the ethylene and not by the organometallic reagent. This will insure formation of a homogeneous precipitate of $VCl_3$ on the substrate without premature reaction of the $VCl_3$ with the organometallic reagent apart from the substrate. Thereafter, the addition of an organometallic reagent to the $VCl_3$ treated substrate will result in the in situ formation of an active initiator to effect polymer growth at, on and around each substrate particle, fiber or filament. Since the $VCl_3$ is caused to precipitate homogeneously over the entire surface of the substrate, the addition of the organometallic reagent results in the formation of catalyst complex which is uniformly and completely distributed over the entire substrate surface. This homogeneous distribution of catalyst complex assures the formation of high quality and uniformly distributed polymer coatings on the substrate.

The ethylene monomer may be added to the substrate before, after or during the $VCl_4$ addition. Once added, the flow of monomer may be continued after it has effectively reduced the $VCl_4$ and may be present during the reaction of the organometallic reagent with the $VCl_3$ homogeneously precipitated on the substrate. The ethylene reduction of the $VCl_4$ to $VCl_3$ may be accomplished in 10–15 minutes or less. If desired, the monomer addition may be stopped after the $VCl_3$ has been caused to form on the substrate and reintroduced during or after the reaction of the organometallic reagent with the $VCl_3$ on the treated substrate. It is desirable to employ adequate agitation during the process of this invention to facilitate the distribution of the $VCl_3$ precipitate homogeneously over the substrate surfaces.

The complete catalyst may be formed at temperature up to about 90° C. This temperature is considerably higher than temperatures used in conventional catalyst formation and polymerization techniques. After catalyst formation, the polymerization may be run at any temperature up to the reflux temperature of the liquid medium employed. When the liquid medium is heptane, the polymerization temperature may be up to about 93° C.

An unexpected corollary of the elevated temperatures at which the catalyst can be formed and the polymerization run is that the molecular weight of the formed polymer is surprisingly high. Reduced specific viscosities (RSV), which indicate the molecular weight of the polymer, are in the range of 30–40 for runs in which the catalyst has been formed and the polymerization run at temperatures of about 85° C. and above. The process of this invention thus fosters the growth of polymer whose molecular weight is not adversely affected by elevated temperatures. Former organometallic-transition metal halide catalyst systems were heat sensitive so that molecular weights of the polymer coatings would decrease at elevated catalyst formation and polymerization temperatures.

The substrate materials contemplated wihin the scope of this invention include: cellulosics such as wood, wood fibers, sawdust, wood flour, paper pulp, bagasse, cotton batting, linters, filaments or line, hemp, viscose, cuprammonium or cellulose acetate rayons, cellulose compounds such as cellulose acetate and the like. Applicable substrate materials include: carbon black, particulate and fibrous siliceous materials, metal particles and fillers, extenders, pigments and reinforcing agents.

It is important when utilizing organometallic-transition metal halide catalyst systems to conduct the polymerization under substantially oxygen free and anhydrous conditions. It is preferred to azeotrope dry the substrate and organic liquid medium. However, it is now possible to run a successful encapsulation procedure after drying times as low as one hour instead of the longer drying periods heretofore necessary with more sensitive catalyst systems formed by conventional procedures. To avoid contamination by air, moisture or carbon dioxide, a pure and, if desired, pressurized atmosphere may be maintained in the polymerization vessel by the influx of ethylene, nitrogen or inert gas.

The organic liquid medium in which the substrate material is slurried must not dissolve or adversely react with the catalyst, the components thereof, substrate, monomer or polymer formed. Any organic liquid which meets these requirements may be employed. Heptane is preferred because its boiling point of about 93° C. is near the higher catalyst formation temperatures contemplated by the process of this invention. Thus, post azeotrope cooling to the temperature at which the catalyst can be formed may be accomplished quickly and easily. Since as more fully explained above, the process of this invention is less sensitive to impurities than conventionally formed and used organometallic-transition metal halide catalyst systems, organic liquid media of less than the highest purity can be used without the necessity of a special purification procedure.

After the desired amount of polymer coating has been formed, the substrate slurry can be removed from the reaction vessel and pressed or filtered to remove the free organic liquid. The bulk of the catalyst residue is then washed away in water, methanol or other appropriate catalyst solvent and the encapsulated substrate is dried.

The organometallic reagent may be selected from among those known in the art to react with a transition metal halide to form an initiator effective to polymerize 1-olefins. Representative of such known organometallic reagents are: substituted or unsubstituted alkyls or aryls of one of the metals lithium, sodium, potassium, magnesium, calcium, zinc, cadmium, boron or aluminum. Of these known organometallic reagents it is preferred to use an alkyl aluminum such as triethyl aluminum ($AlEt_3$).

The molar ratio of $VCl_4$:organometallic reagent may vary between about 1:1 and about 1:3. The $VCl_4$ concentration may vary between about 0.010 to about 0.20 millimole per gram of dry substrate. Higher concentrations may be employed but with little advantage to be gained thereby. At lower concentrations than about 0.010 millimole per gram of substrate there is insufficient $VCl_3$ to be completely and uniformly distributed over the entire substrate surface. The catalyst complex subsequently formed with the organometallic reagent will thus yield low polymer levels and the reaction rate will be slow and uneconomical. Within this operable and practical range of $VCl_4$ concentrations it is perferred to employ $VCl_4$ at between about 0.027 and about 0.045 millimole per gram of dry substrate. These preferred concentrations are, as discussed below about one-fourth the levels required with conventional catalyst systems.

Before the ethylene reduction of this invention, it was attempted to reduce $VCl_4$ to $VCl_3$ by heat refluxing. However, heat refluxing suffers serious disadvantages compared to my method of ethylene reduction. This is especially true when attempting to encase individual discrete substrate particles, fibers or filaments with polyethylene. With heat refluxing, it is necessary to wash away any unreduced $VCl_4$ from the system prior to the addition of the organometallic reagent. Otherwise, the substrate will be incompletely coated, free polymer will be formed apart from the substrate, there will be a necessary induction period and the polymerization will be significantly slower. In addition to the disadvantage of the extra washing step, the heat reduction of $VCl_4$ to $VCl_3$ will take about 1–2 hours whereas ethylene reduction may be accomplished in 10–15 minutes or less.

In order that the invention may be more readily understood, the following examples are given:

EXAMPLE I

A 100 gallon reactor was charged with 23.2 pounds (22 pounds dry) of Weyerhaeuser cellulose fibers and 575 pounds of heptane. The resulting slurry was azeotrope dried 1 hour and 40 minutes then cooled to 50° C. under nitrogen. Then 454 millimoles of $VCl_4$ (.045 mM. per gram of dry substrate) was added to the slurry with adequate agitation followed by introduction of ethylene gas into the slurry. Fifteen minutes after the introduction of ethylene gas, 910 millimoles of $AlEt_3$ (.091 mM. per gram of dry substrate) was added without interrupting the flow of monomer. Agitation was maintained. Polymerization began immediately upon $AlEt_3$ addition and was stopped in 37 minutes with the formation of about 25 pounds of polyethylene, (54.8% of total weight of the encapsulated cellulose). The cellulose was completely coated with high quality polyethylene; no free polymer was formed; RSV was 9.1.

EXAMPLE 2

A 5 liter flask was charged with 118 grams (110 grams dry) of Weyerhaeuser cellulose fibers and 3800 ml. heptane. The resulting slurry was azeotrope dried for 4 hours and cooled under nitrogen to 50° C. Then 5 millimoles of $VCl_4$ (0.045 mM. per gram of dry substrate) was added with adequate agitation and ethylene gas was introduced into the slurry. Ten minutes after the flow of ethylene was begun, 10 millimoles of $AlEt_3$ was added (0.091 mM. per gram of dry substrate) without interrupting the flow of monomer. Agitation was maintained continually. Polymerization began immediately upon $AlEt_3$ addition. The temperature was maintained at 60° C. with cooling. Ethylene flow was stopped in 30 minutes with the formation of 122 grams of polyethylene, (52% of total weight of the encapsulated cellulose). No free polymer was formed. The completely encapsulated product was filtered, washed and dried; RSV was 26.8.

EXAMPLES 3–17

The general procedure of Example 2 was followed in the examples given below with cooling, if any, to catalyst formation temperature effected under nitrogen. Azeotrope drying may have varied for longer or shorter periods than 4 hours. In these examples as in Examples 1 and 2 above, the products were completely encapsulated substrates with high quality polyethylene coatings and no free polymer formed.

| Example Number | Charge (5 liter flask) | Catalyst mM./gm. Dry VCl₄ | Catalyst substrate AlEt₃ | Catalyst formation temp., °C. | Polymerization temp., °C. | Reaction time, min. | Polyethylene coating, gms. | RSV |
|---|---|---|---|---|---|---|---|---|
| 3 | 70 gms. cellulose, 3,600 ml. heptane | 0.71 | .143 | 30 | 40 | 23 | 80 | 16.8 |
| 4 | Same as Example 2 | .045 | .091 | 30 | 40 | 35 | 130 | 27.7 |
| 5 | Same as Example 2 except 1 hr. azeotrope | .045 | .091 | 25 | 40 | 18 | 126 | 12.8 |
| 6 | Same as Example 2 | .045 | .045 | (¹) | 40 | 50 | 109 | 17.9 |
| 7 | do | .045 | .136 | (¹) | 40 | 25 | 115 | 20.4 |
| 8 | do | .045 | .091 | 24 | 46 | 25 | 129 | 21.9 |
| 9 | do | .027 | .054 | 50 | 50 | 25 | 116 | |
| 10 | Same as Example 2 (reactor flushed with N₂ before AlEt₃ addition) | .045 | .091 | 50 | 65 | 90 | 108 | 19.6 |
| 11 | Same as Example 2 | .045 | .136 | 50 | 80 | 90 | 118 | 23.5 |
| 12 | do | .045 | .091 | 85 | 85 | 125 | 108 | 40.0 |
| 13 | do | .045 | .091 | 85 | 85 | 115 | 103 | 33.0 |
| 14 | do | .045 | .091 | >93 | >93 | 150 | 72 | |
| 15 | 25 gms. glass fiber, 1,800 ml. heptane | 0.20 | 0.20 | 25 | 55 | 21 | 91 | 28.8 |
| 16 | 60 gms. carbon black, 3,600 ml. heptane | 0.166 | 0.333 | 80 | 80 | 95 | 147 | 13.9 |
| 17 | Same as Example 2 | VCl₄ .045 | (²) ².091 | (¹) | 55 | 47 | 70 | 9.8 |

¹ Room Temp.
² Diethyl Aluminum Chloride.

The foregoing examples illustrate specific embodiments of the instant invention. The examples recast in the table below were selected for comparison of catalyst concentrations and polymerization rates with a typical convention organometallic-transistion metal halide catalyst system such as titanium tetrachloride (TiCl₄) and triethyl aluminum (AlEt₃). When such conventional systems represented by TiCl₄–AlEt₃ are employed, preferred polymerization temperatures are generally in the range of 50°–65° C. with the catalyst formed at somewhat lower temperatures.

The examples set out in the table below were chosen because similar polymerization temperatures, i.e. about 50°–65° C., and similar formation temperatures, i.e. room temperatures to 50° C., were employed.

TABLE

| | Catalyst mM./gm. Dry substrate | | Polymerization temp., °C. | Reaction time, mins. | Polyethylene coating, gms. |
|---|---|---|---|---|---|
| | VCl₄ | AlEt₃ | | | |
| (Example 2) 110 gms. dry cellulose fibers, 3,800 ml. heptane | .045 | .091 | 60 | 30 | 122 |
| (Example 8) 110 gms. dry cellulose fibers, 3,800 ml. heptane | .045 | .091 | 46 | 25 | 129 |
| (Example 9) 110 gms. dry cellulose fibers, 3,800 ml. heptane | .027 | .054 | 50 | 25 | 116 |
| (Example 10) 110 gms. dry cellulose fibers, 3,800 ml. heptane | .045 | .091 | 65 | 90 | 108 |

A typical conventional cellulose encapsulation run employing a TiCl₄–AlEt₃ catalyst system would fairly employ concentrations of between about 0.10 to about 0.27 mM. of TiCl₄ per gram of dry cellulosic substrate with reaction times of at least 2 and up to 4 hours to produce polyethylene coatings of up to about 100 grams. Contrasting this conventional system with that of the instant invention as represented in the above table the following conclusion result. Using the instant invention, one can now expect to use catalyst concentrations, i.e. 0.027–0.045 mM. VCl₄ per gram of dry cellulosic substrate, of about one-fourth that of conventional systems, i.e. 0.10–0.27 mM. TiCl₄ per gram of dry substrate, and reaction times of 25–90 minutes to produce an amount of polyethylene coating which would take 120–240 minutes to produce with a conventional system such as TiCl₄–AlEt₃. This represents an increase in polymerization rates of up to 1000%.

While this invention has been described in terms of certain specific embodiments and illustrated by way of specific examples, these are illustrative only.

What is claimed is:

1. A process for polymerizing ethylene monomer on a substrate in the form of discrete particles, fibers or filaments comprising providing a substrate slurry, adding vanadium tetrachloride to the substrate slurry, reducing the vanadium tetrachloride in said slurry to vanadium trichloride with ethylene, depositing a substantially uniform layer of the vanadium trichloride on the substrate surfaces, reacting an organometallic reagent with the vanadium trichloride on the treated substrate to provide an active polymerization catalyst on the substrate surfaces thereby polymerizing ethylene monomer on the substrate by the catalyst treated substrate contacting the monomer and forming separate encasing shells of polyethylene on the discrete particles, fibers or filaments of the substrate.

2. A process according to claim 1 wherein the molar ratio of vanadium tetrachloride:organometallic reagent is between 1:1 and about 1:3 and wherein the substrate is treated with not substantially less than about 0.010 millimole of vanadium tetrachloride per gram of dry substrate and not substantially more than about 0.20 millimole of vanadium tetrachloride per gram of dry substrate.

3. A process according to claim 1 wherein the organometallic reagent is triethylaluminum.

4. A process for polymerizing ethylene monomer on discrete particles, fibers or filaments of a cellulosic material comprising providing a slurry of a cellulosic material, adding vanadium tetrachloride to the slurry, reducing the vanadium tetrachloride in said slurry to vanadium trichloride with ethylene, depositing a substantially uniform layer of the vanadium trichloride on the cellulosic material, reacting an organometallic reagent with the vanadium trichloride on the treated cellulosic material to provide an active polymerization catalyst on the cellulosic material thereby polymerizing ethylene monomer on the cellulosic material by the catalyst treated cellulosic material contacting the monomer and forming separate encasing shells of polyethylene on the discrete particles, fibers or filaments of cellulosic material.

5. A process according to claim 4 wherein the molar ratio of vanadium tetrachloride:organometallic reagent is between about 1:1 and about 1:3 and wherein the cellulosic material is treated with not substantially less than about 0.010 millimole of vanadium tetrachloride per gram of dry cellulosic material and not substantially more than about 0.20 millimole of vanadium tetrachloride per gram of dry cellulosic. material.

6. A process according to claim 1 wherein the substrate is carbon black.

7. A process according to claim 1 wherein the substrate is glass fiber.

8. A process according to claim 4 wherein the organometallic reagent is triethylaluminum.

References Cited

UNITED STATES PATENTS

| | | | |
|---|---|---|---|
| 2,935,495 | 5/1960 | Kennedy | 260—94.9 X |
| 2,939,846 | 6/1960 | Gordon et al. | 260—94.9 X |
| 3,083,118 | 3/1963 | Bridgeford | 117—62.2 X |
| 3,121,698 | 2/1964 | Orsino et al. | 117—100 X |
| 2,684,305 | 7/1954 | Quinlinan | 117—126 X |

WILLIAM D. MARTIN, Primary Examiner

M. R. P. PERRONE, Jr., Assistant Examiner

U.S. Cl. X.R.

117—100, 126, 143, 145, 148; 162—169